No. 814,836. PATENTED MAR. 13, 1906.
A. ELLIOTT.
PROCESS OF COPPER SEPARATION.
APPLICATION FILED DEC. 19, 1904.
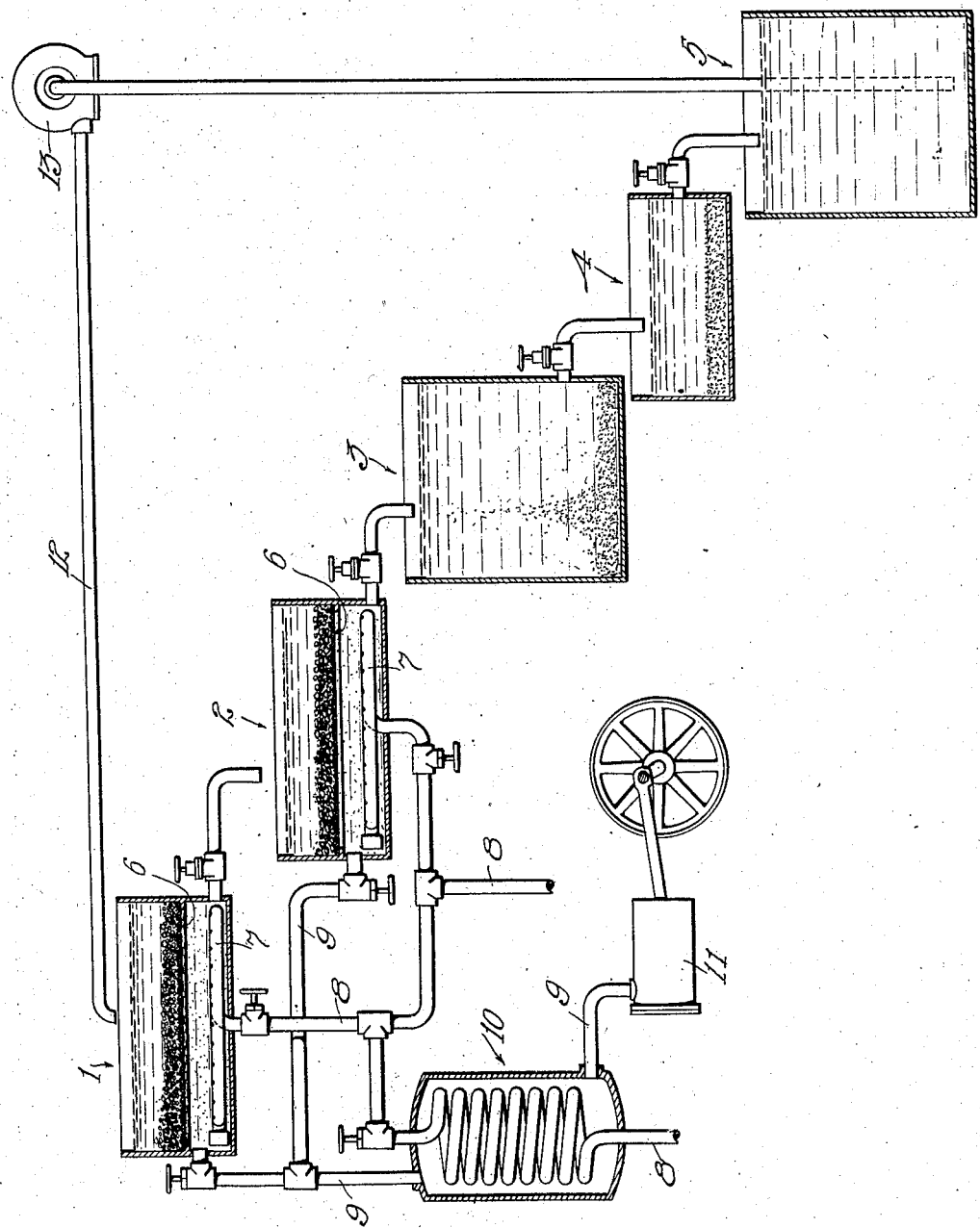
Witnesses
Inventor
Alexander Elliott

UNITED STATES PATENT OFFICE.

ALEXANDER ELLIOTT, OF LITTLEROCK, CALIFORNIA.

PROCESS OF COPPER SEPARATION.

No. 814,836.

Specification of Letters Patent.

Patented March 13, 1906.

Application filed December 19, 1904. Serial No. 237,423.

*To all whom it may concern:*

Be it known that I, ALEXANDER ELLIOTT, a subject of the King of the United Kingdom of Great Britain and Ireland, residing at Littlerock, in the county of Los Angeles, State of California, have discovered and invented a new and useful Process of Copper Separation, of which the following is a specification.

The main object of this invention is to provide for the extraction of copper from its ores at a minimum of expense.

A further object of the invention is to provide a process for the separation of copper from low-grade ores the copper values of which do not warrant the application of the usual processes.

Another object of the invention is to provide a process which can be successfully used in the separation of copper from ores containing bases—such as lime, iron, &c.—in such quantity as to be unavailable in the usual processes, such as by leaching by acid solutions. The present invention provides for leaching the ores by a non-acid solution.

Another object of the invention is to provide a process for the separation of copper from ores containing precious metals along with copper in such quantities as to interfere with the economical cyaniding or similar treatment of the ores. In this connection the invention provides for initial separation of the copper, leaving the gold and silver values in the ore for treatment in the usual manner.

Another object of the invention is to provide a process which will be continuous, the reagent used being regenerated in the course of the process, so that a limited quantity of reagent used in starting the process will serve for an indefinite amount of ore.

I have discovered that by subjecting ores which contain the copper in combination with oxygen to the action of ferrous-sulfate solution and passing air through the solution the copper will be dissolved out as sulfate, especially if the solution is hot, and my present invention is based on this discovery. The solution does not take place with non-oxidized ores of copper, such as sulfids, and my invention is applied in connection with ores which are naturally in oxidized condition, as the oxids and carbonates, or to ores which have been converted to this condition, as by roasting. The word "oxidized" is therefore herein used as including either the natural or artificially-produced condition of combination with oxygen.

The process is intended for application to oxygenous or non-sulfurous ores, as aforesaid, and in applying it to non-oxygenous or sulfurous ores, such as sulfids, it is requisite to first oxidize the ores, as by roasting.

The process consists, essentially, in submitting oxidized or oxygenous sulfur ores to the action of a non-acid solution of ferrous sulfate in the presence of air, thereby dissolving the copper, and in draining off the copper solution and separating the copper therefrom in any suitable manner, as by filtering, decantation, or precipitation. In this precipitation ferrous sulfate will be left in the solution and will be used in repeating the process on a new supply of ore. The ferrous-sulfate solution is preferably hot. During the leaching operation the ferrous sulfate is oxidized to ferric sulfate by the action of the air, such ferric sulfate being thereby presented in a nascent state, wherein it will be in condition to act on the copper oxid in the most effective and rapid manner.

The accompanying drawing illustrates an apparatus suitable for the carrying out of the process.

1 designates the first-leaching tank or vat; 2, the second-leaching tank or vat, located at a lower level than the vat 1.

3 designates the settling-tank.

4 designates the precipitating tank or vat, and 5 is the sump-tank.

Each of the leaching-vats has a filter 6 and a heating-coil 7 below the filter, which may be supplied with steam through the steam-supply connections 8. Said coils are preferably perforated to allow the steam to escape into the tanks to agitate the solution in the bath and the materials therein.

9 designates air-supply pipes or conduits opening into the respective leaching-tanks below the filter to supply air thereto. Such air is preferably heated, as by means of a heater 10.

11 designates means for supplying air under pressure—for example, an air-compressor.

For carrying out the process continuously a conduit or connection 12 is provided, leading from the sump-tank back to the first leaching-tank, said connection including a pump 13 for pumping back the fluid.

The process is carried out as follows: The ore is assumed to be non-sulfurous—such as oxid, carbonate, or silicate ores—or to have been rendered non-sulfurous by oxidation, as by roasting sulfid ore. The ore having been crushed to a suitable condition for the action of the leaching agent, a higher-level vat or vats and a lower-level vat or vats are charged therewith. A solution of ferrous sulfate of sufficient strength and quantity to take up when oxidized to ferric sulfate all the copper in the ore is placed in the first vat. The quantity of sulfate required will depend upon the amount of copper in the ore and will be determined in accordance with the equation hereinafter given. To produce a rapid solution there should be a slight excess of ferrous sulfate. The material in the first tank is heated by the steam-coil, and air is admitted thereto, preferably in a heated condition, with the result that the ferrous sulfate is oxidized to ferric sulfate. The ferric sulfate under the action of heat dissolves the copper in the ore and deposits iron in the form of ferric oxid. The steam escaping from the coil into the tank agitates the materials therein and facilitates and hastens the action. It is found that the leaching action of the ferric sulfate is greater at a higher temperature, and the leaching operation is preferably carried out at a temperature of about the boiling-point of water. Having found by test that all the copper is extracted from the ore in the first vat, the solution is then run into the second vat or leaching-tank, where the same operation is repeated to allow it to exchange its remaining iron, &c., for copper, so that the copper solution when run into the precipitating-tank will contain no ferric salt. The presence of ferric salt would tend to make an impure copper by the deposit of ferric oxid. An air-supply pipe 9 may lead to the second leaching-tank to supply air thereto when it is desired to complete the solution of the copper therein. After leaching the material may be washed repeatedly until all the copper sulfate is removed and recovered. The copper solution is then run into the settling tank or tanks 3, where it remains until all sediment has settled to the bottom. The copper-sulfate solution is then run off or decanted into the precipitating-tank 4, and by means of scrap-iron, with the aid of heat, or by electrolysis, or in other suitable manner the copper is precipitated and extracted therefrom. The waste solution after the copper is taken out is run into the sump-tank 5. Said waste solution contains practically all the ferrous sulfate which was put into the leaching-vat and is pumped through the pump 12 onto a new charge of ore in the first leaching-vat, where it undergoes the same series of operations above described. By a small addition of sulfate each time to the solution its full strength can be maintained.

The reactions which occur in the above operations are as follows:

First. Oxidation of the ferrous sulfate to ferric sulfate:

$$6FeSO_4 + O_3 = 2Fe_2(SO_4)_3 + Fe_2O_3.$$

Second. The leaching operation:

$$Fe_2(SO_4)_3 + 3CuO = 3CuSO_4 + Fe_2O_3.$$

Third. Precipitation:

$$CuSO_4 + Fe = Cu + FeSO_4.$$

While the method of oxidizing the ferrous salt described above is by means of air, I do not confine myself to it, but claim the right to use other suitable means to bring about the same result. The ferrous salt may be oxidized before adding it to the ore, if desired.

In applying the process to the sulfid ores it is necessary, as above stated, to first roast the ores to remove substantially all the sulfur therefrom.

The process is applicable with advantage to the separation of copper from ores containing that metal in conjunction with gold and silver, the result of the process in that case being that the ore is left with substantially the full gold and silver content, but free from copper, so that it is in suitable condition for the use of cyanid or other treatment for the recovery of the precious metals without the loss which would result from the application of such treatment to the raw ore on account of the presence of copper. The present process renders it possible to treat the ores for the recovery of gold and silver therefrom in cases where the presence of copper therein would otherwise prevent satisfactory and economical operation. The process is also of especial advantage in connection with ores containing bases, such as lime or iron, in such quantities as to interfere with the application of the usual acid leaching agent. The leaching agent in this case being non-acid is not affected by the presence of such bases, and the latter are without deleterious effect on the operation.

What I claim is—

1. The process of leaching oxidized copper ores which consists in submitting the ore to the action of a non-acid solution of ferrous sulfate and passing air through the solution during the operation of leaching.

2. The process of leaching oxidized copper ores which consists in submitting the ore to the action of a hot non-acid solution of ferrous sulfate and passing air through the solution during the operation of leaching.

3. The process of separating copper from oxidized ores which consists in leaching the ore with a hot non-acid solution of ferrous sulfate, passing air through the solution during the operation of leaching, separating the solution from the residue, and precipitating the copper from the solution by means of iron, thereby regenerating the ferrous sulfate for a repetition of the process.

4. The process of separating copper from ores containing basic gangue, which consists in leaching the ore with a hot non-acid solution of ferrous sulfate, passing air through the solution during the operation of leaching, separating the solution from the residue, precipitating the copper from the solution by means of iron and utilizing the resulting solution of ferrous sulfate for a repetition of the process.

In testimony whereof I have hereunto set my hand, at Los Angeles, California, this 10th day of December, 1904.

ALEXANDER ELLIOTT.

In presence of—
ARTHUR P. KNIGHT,
FREDERICK S. LYON.